(No Model.)

S. T. ARNETT.
ANT TRAP.

No. 249,870.          Patented Nov. 22, 1881.

Witnesses:
W. W. Mortimer
Theo. Munger

Inventor:
S. T. Arnett,
per F. A. Lehmann,
Atty.

UNITED STATES PATENT OFFICE.

SANDRIDGE T. ARNETT, OF KOSSE, TEXAS.

ANT-TRAP.

SPECIFICATION forming part of Letters Patent No. 249,870, dated November 22, 1881.

Application filed August 10, 1881. (No model.)

*To all whom it may concern:*

Be it known that I, SANDRIDGE T. ARNETT, of Kosse, in the county of Limestone and State of Texas, have invented certain new and useful Improvements in Ant-Traps; and I do hereby declare the following to be a full, clear, and exact description of the invention, such as will enable others skilled in the art to which it pertains to make and use it, reference being had to the accompanying drawings, which form part of this specification.

My invention relates to an improvement in ant-traps; and it consists in a collar which is to be placed around the top of the ant-hole, and which collar has a deep groove made in its upper side and a hole in its bottom, and which has to be used in connection with a vessel of any kind, which is filled with water and placed in the ground in a hole below the collar, substantially as shown and described.

The object of my invention is to provide a cheap and simple means of exterminating ants without the necessity of having to force poisonous vapors down into their holes, or to use poisons of any kind.

Figure 1:
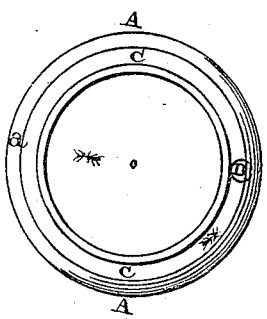
Figure 2:
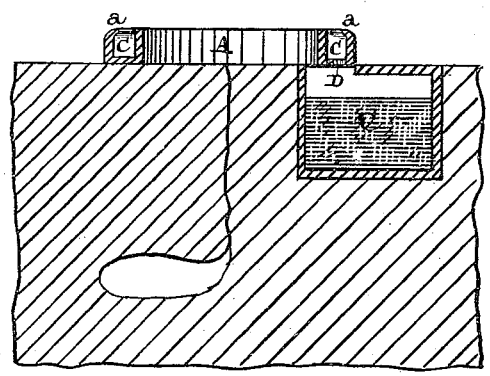

Figure 1 represents a plan view of my invention. Fig. 2 is a vertical section of the same.

A represents a collar of any desired shape or size, and which will be made of earthenware or any other suitable cheap material. In the top of this collar there is made a deep groove, C, and through the collar, from the bottom of this groove, is made a suitable opening, D. The outer walls of this collar may be made slightly inclined upon their inner sides, and have a flange or any other suitable extension, *a*, projecting inward at the top, if so preferred, for the purpose of preventing the ants from readily crawling up over the collar and escaping. This construction is more a matter of choice than of necessity. This collar is to be used in connection with a pail, of any kind which will hold water or other liquid, and which pail is to be sunk in the ground at one side of the ant-hole so that the hole through the collar will be just above it. After the pail has been placed in position the collar is placed around the ant-hole, so that the hole through it will be immediately over the pail of water. The ants, in coming from their hole, will have to pass over the collar before they can get out of it, and as soon as they attempt to climb over the collar they fall down into the groove that is made in its top. They at once begin moving around upon the bottom of the collar, hunting for some way of escape, and as soon as they come to the hole D they pass down through it and fall into the water below, where they are drowned.

I am aware that a collar having its lower portion formed into a water-tank has heretofore been used as an ant-trap, and this I disclaim.

I am also aware that a concave perforated plate has been placed upon a glass of water for forming a fly-trap, and this I also disclaim.

Having thus described my invention, I claim—

As a new article of manufacture, the ring A, having the groove C made in its top and the hole D through its bottom, and having the flange or turned-in edge *a* formed on top of its outer wall, the collar being adapted to be placed on the ground around the ant-hole and over one edge of a vessel of water, substantially as shown and described.

In testimony whereof I affix my signature in presence of two witnesses.

SANDRIDGE THOMAS ARNETT.

Witnesses:
   JOHN LLOYD,
   T. J. RHODES.